Dec. 29, 1953
C. A. GREINER ET AL
2,663,897
APPARATUS FOR REMOVING HEADS FROM BODIES OF SHRIMPS
Filed April 27, 1950
3 Sheets-Sheet 1
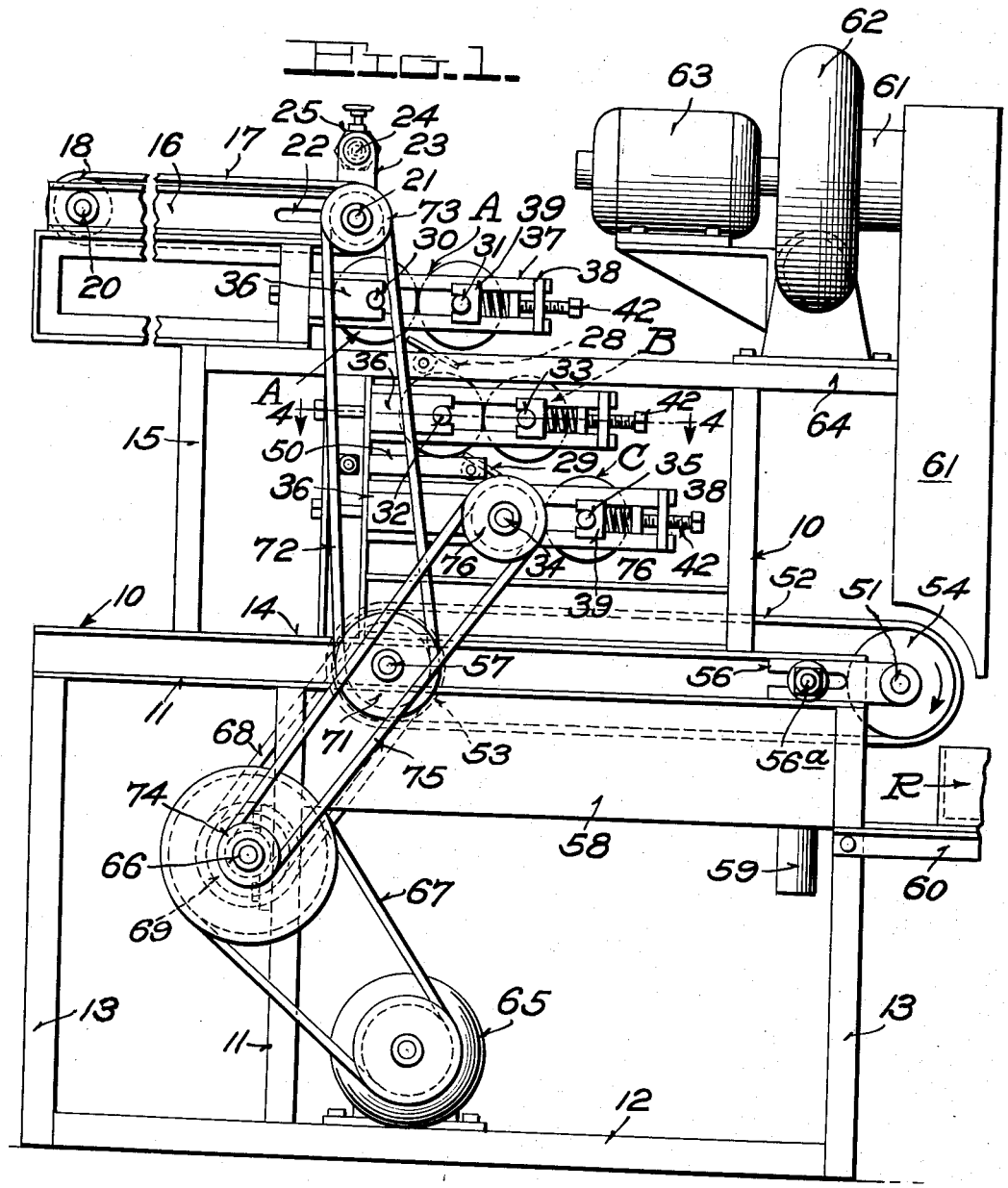
INVENTORS
CHARLES A. GREINER,
ELBERT F. GREINER,
BY *A. B. Willson & Co.*
ATTORNEYS

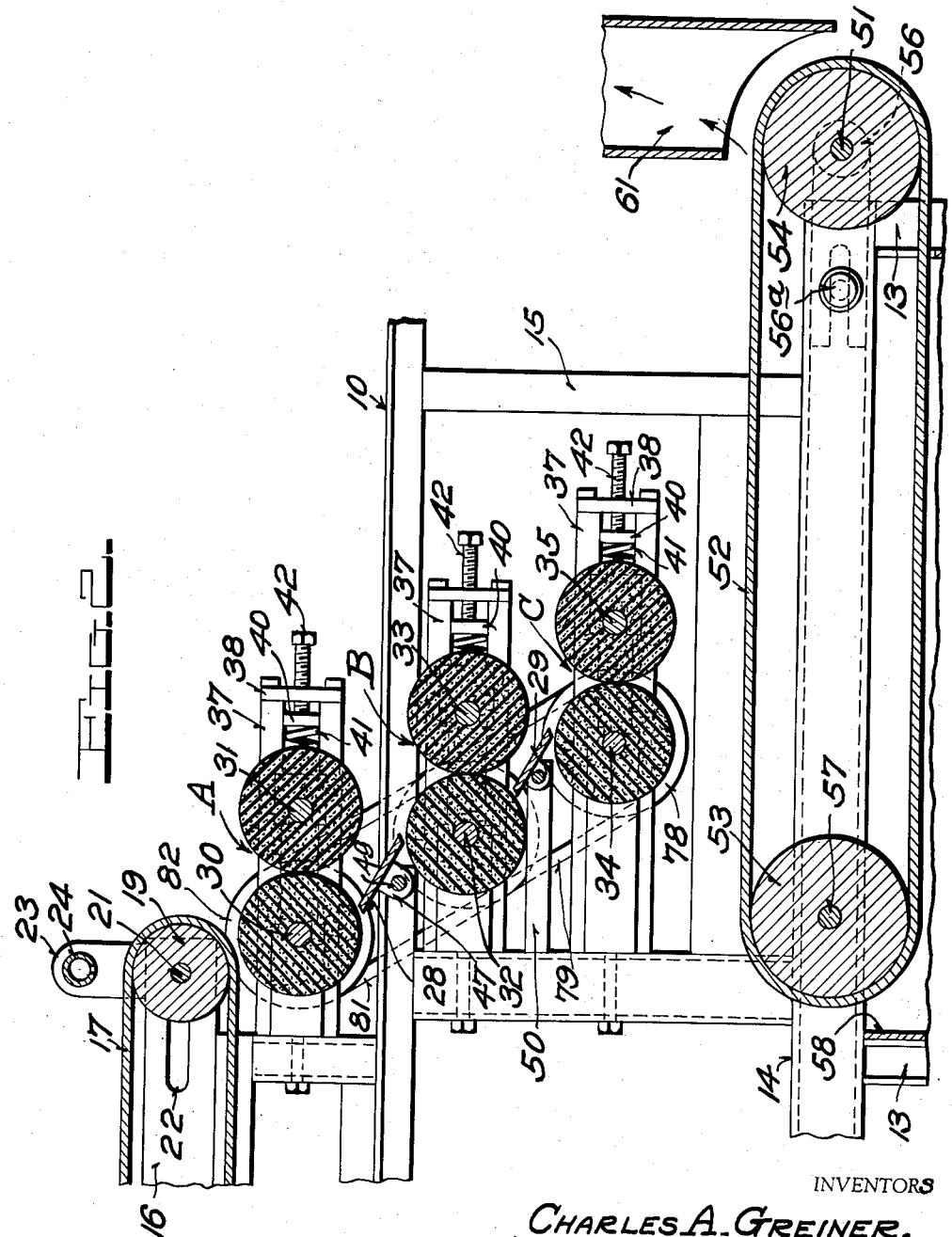

Dec. 29, 1953  C. A. GREINER ET AL  2,663,897
APPARATUS FOR REMOVING HEADS FROM BODIES OF SHRIMPS
Filed April 27, 1950  3 Sheets-Sheet 3
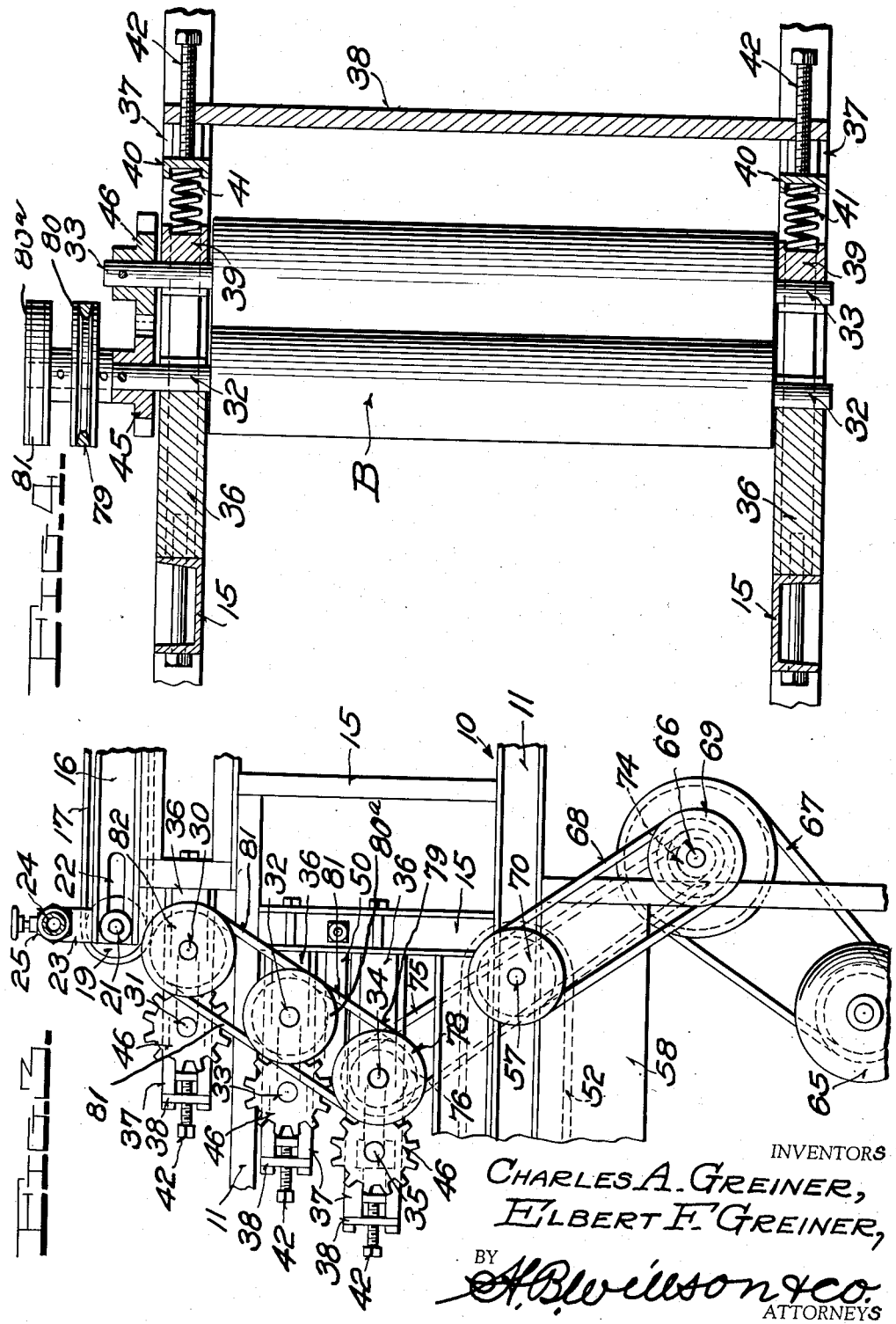
INVENTORS
CHARLES A. GREINER,
ELBERT F. GREINER,
BY H. B. Wilson & Co.
ATTORNEYS Patented Dec. 29, 1953

2,663,897

UNITED STATES PATENT OFFICE 2,663,897

APPARATUS FOR REMOVING HEADS FROM BODIES OF SHRIMPS

Charles A. Greiner, New Orleans, and Elbert F. Greiner, Metarie, La.

Application April 27, 1950, Serial No. 158,514

8 Claims. (Cl. 17—2)

Our invention relates to the preparation of shrimps for the market and more particularly to the removal of the heads from the bodies of shrimps. The method described herein was originally disclosed in our application Serial No. 136,774, filed January 4, 1950.

In marketing shrimps it has been customary to separate the heads from the bodies or tail portions promptly after they are removed from the water; and in the past that has usually been done by hand, although machines for doing it have been proposed.

The structure of a shrimp is such that the head portion is connected by a weak joint to the body or tail portion which contains the edible meat. Further, the head portion and especially the connecting joint are relatively soft and easily crushed as compared to the much firmer body or tail portion containing the muscle meat; and, hence, the latter may be subjected to a very much higher pressure without being mutilated or damaged. It may also be noted that the body of a shrimp is longitudinally tapered, being much thicker at its head end than at its tail end, and that from the latter there projects a fan-like tail which forms a part of the shell that encloses the meaty part of the body. From the head there projects not only a number of feet and feeding members but two antennae or feelers which are usually as long as or longer than the entire body and head portions of the shrimp. The antennae are strong and so firmly attached to the head that when they are pulled while the body of the shrimp is held, the weak connection between the head and body will be broken or severed. The head of the shrimp contains only the soft digestive organs and consequently will not resist the pressure that the firm body and tail meat can. However when the head is compressed or deformed by pressure, its structure is such that it tends to resume much of its original shape as soon as the pressure is released.

We have discovered that by simply passing shrimps between two opposed pressure rolls of suitable construction many of the shrimps will have their heads pinched off or completely severed from their body portions by the squeezing pressure of the rolls. We have employed a pair of rolls of approximately two inches in diameter made of sponge rubber, one of the rolls being driven and the other being subjected to a suitable pressure so that as the shrimp passes between the opposed cylindrical surfaces its head will be partially crushed or deformed and the weak joint between its head and the body will be severed, while the firmer body portion will cause the cylindrical surfaces to be deformed to permit the body portion to pass through without the contained meat being mutilated. While it is desirable to feed the shrimp between the rollers in the direction of its length, that is, either head first or tail first, the rotation of the contacing rolls or rollers will tend to turn the length of the shrimp to a position at right angles to the length of the rolls. Such turning movement of the shrimp will not take place, to any substantial extent, if the longitudinally curved top or back of the shrimp is first presented to the bight or crotch of the rolls, and in such case the shrimp will pass between two rolls without, in most cases, having its crushed or deformed head separated from its body; but when either the tail or the antennae or projecting parts on the head are first gripped by the rolls, the peripheral speed of the latter will tend to turn the shrimp or pull it around either tail first or head first. Since those thin parts, the flat tail shell and the antennae or feelers, will not cause the resilient surfaces of the rolls to be deformed, while the thicker body of the shrimp will, the peripheral speed of the cylindrical surfaces of the rolls will be greater than the peripheral speed of the depressed portions which grip the thick body. Consequently, the rolls have a tendency to turn the shrimp to an endwise position as it moves between the rolls. It is the squeezing pressure across or substantially across the weak joint or connection between the head and body of the shrimp that causes the head to be popped off or separated from the body when the shrimp is passed between two opposed resilient and deformable pressure rolls.

In our above mentioned application Serial No. 136,774 we have disclosed several forms of the invention of deheading by the pulling action of differentially driven roll sets, and we illustrated in the drawings two forms of machines in both of which means were provided to feed the shrimps, as far as possible, endwise between the first set of two or more sets or pairs of pressure rolls, the sets being so arranged so that in most instances the shrimp body is simultaneously gripped by the rolls of two adjacent pairs one of which is driven at a higher speed than the other so that there is a pulling action at longitudinally spaced points on the shrimp as well as a rolling pressure contact. While such machines do effective work in deheading the shrimps their capacity is not very large. The method of deheading the shrimps by the pulling or tearing action of two sets of rolls driven at different speeds is claimed in said application Serial No. 136,774.

We have found that by employing larger rolls preferably of 4 inch diameter, of sponge rubber with its skin removed and driving them at a higher speed of 450 to 800 R. P. M., and by employing two or three pairs or sets of such rolls spaced vertically with the pairs or sets also stepped or spaced laterally and with deflector plates between next adjacent sets to direct the shrimps dropping from one set to the set next below, a highly effective and large capacity machine is produced. We find in such a machine it is not necessary to attempt to guide the shrimps head first or tail first to the upper set of rolls and, hence, any ordinary conveyor belt may be used to feed the shrimps and water to them. The shrimps may be fed to those rolls in a thin stream or layer, and even though some of the shrimps partially overlie others when they pass through the rolls, their body meats will not be crushed or damaged, due to the soft yieldable and resilient nature of the sponge rubber, and a very large proportion of the shrimps will be completely decapitated during such passage. The use of the angularly positioned or inclined deflector plates between the sets of rolls will cause the shrimp to be turned or shifted so that it will enter the crotch of the next lower set of rolls in a different position from that in which it entered the preceding set. Consequently, the passage of the shrimps through the second set of rolls will decapitate most of the shrimps which were not decapitated by the first set or only partially decapitated. When the shrimps drop from the third or lower most set of rolls, practically all of them will be deheaded, but the bodies will not be mutilated or damaged. The arrangement is such that large quantities of shrimps may be rapidly passed through the machine in a short period of time, and practically all of the shrimps, both large and small, will have their heads removed.

The primary object of our invention is the provision of means for deheading shrimps which will be rapid and effective in operation so that a great saving in time and labor will be accomplished.

Further objects and advantages will hereinafter appear, the invention residing in the new procedures and in the new structures, combinations and arrangements of parts set forth in the following description, defined in the appended claims and shown in the accompanying drawings, in which:

Figure 1 is an elevation of one side of a shrimp deheading machine embodying our invention and usable for practicing our process;

Fig. 2 is a vertical longitudinal section showing the operative parts of the machine;

Fig. 3 is an elevation of a portion of the opposite side of the machine with parts omitted; and Fig. 4 is a detail horizontal section substantially on the line 4—4 of Fig. 1.

Referring more in detail to the drawings which show the present preferred embodiment of the invention, the numeral 10 denotes a suitable upright and generally rectangular frame which may be made of angle and channel metal members. It comprises a lower portion 11 having a base 12 connected by corner posts 13 to a horizontal table 14, and an upper portion 15 rising from the table portion and in turn supporting a horizontal frame 16. Mounted on the latter are means for feeding shrimps and water to the two or more sets of vertically spaced and horizontal stepped or offset crushing or pressure rolls mounted on the upper frame portion 15. The shrimp feeding means may take the form of an endless conveyor belt 17 of any suitable form and length. It passes around cylindrical rollers 18 and 19 carried by shafts 20 and 21, respectively, suitably journaled in the top frame section 16. Either or both of the shafts may be adjustable to tighten the endless conveyor 17, but as shown the shaft 21 which is driven, as hereinafter described, has its bearings adjustable in slots 22 in the sides of the frame 16. Supported by brackets 23 rising from the frame 16 is a water feed pipe or nozzle 24. The latter is disposed horizontally and transversely above the conveyor adjacent its discharge end and may be simply a pipe having along its under side a row of perforations to spray water upon the shrimps as they pass under it. The feed of water is controlled by a suitable cut-off valve 25.

While the number of pairs or sets of rolls may be varied, we find that three sets are sufficient to completely remove the heads of at least 95 percent of the shrimps passed through the machine. The three sets of rolls are designed A, B and C. The uppermost set A is so positioned transversely of the frame and horizontally below the discharge end of the conveyor 17, that the shrimps and water falling from the latter will drop into the nip bight or crotch of the rollers. The second or intermediate set B is spaced vertically below and is horizontally offset in a rearward direction with respect to the first set A, while the third or bottom set C is similarly arranged with respect to the set B. The offsetting of the pairs of rolls may be three inches or more. The vertical spacing of the pairs or sets is greater; and in order to direct the shrimps and water from one set to the next below set, we provide downwardly and rearwardly inclined deflector plates 28 and 29, as shown in Fig. 2. All of the crushing rolls are preferably driven at the same speed, as presently explained, and due to the speed of rotation the shrimps are thrown against the deflectors and will virtually bounce therefrom into the crotch nip of the next below set of rolls. That tends to throw the shrimp into a different position from the one in which it was when it passed through the previous set.

The rolls of all of the sets or pairs are preferably of the same size and construction and while only one roll of each set may be driven, we find that better results are obtained if both rolls of each pair are driven as later described. The rolls or rollers must be yieldable or deformable and resilient. We have used rolls of sponge rubber four inches in diameter on 1-inch metal shafts, and have found better results are obtained if the so-called skin is removed from the rolls. That gives the rolls a rough cylindrical surface and the squeezing action of the rolls tends to cause the water to be sucked in and forced out so that the water has a more effective cleaning action on the rolls. The sponge rubber used is quite cellular and resilient, and the two rolls of each set are held in contact when no shrimps are between them, by a light spring pressure, as hereinafter described, the rolls and pressure being such that if the fingers are inserted between the driven opposed rolls, the latter will have a tendency to pull the fingers further in but the fingers may be pulled out without injury. The soft resilient nature of the crushing or pinching rolls is such that the thick body of the shrimp is not crushed or mutilated as it passes between the rolls, since the cylindrical roll surfaces will deform to the shape of the body. However, the larger head, which does not contain tough matter, will be partially crushed, that is, collapsed or deformed, and there will be some tendency of the weak joint between the body and head to be broken by such crushing action even when the rounded top or back of the body portion is first to enter the crotch formed by the contacting rolls. In many instances the antennae or the flat fan-like tail of the shrimp will be first engaged by the rolls and due to their peripheral speed the shrimp will be pulled around with its length extending more or less at right angles to the rolls. As the thicker body of the shrimp enters, the rolls will deform and the deformed portions having a smaller diameter will not move at the same peripheral speed as the cylindrical or undeformed portions of the rolls. The result is that many of the shrimps will be subjected to the rolling pressure contact at right angles or substantially at right angles to the length of the shrimp, and, hence, the weak joint between the head and body will be broken and severed or partially severed. Where a shrimp is partially severed by one set of rolls, the next set will usually completely separate the head from the body. We find that the first set deheads about 50 percent of the shrimps, while the second set deheads about 40 percent.

While the crushing rolls may be mounted, driven and held under spring tension in various ways, we have shown the rolls A on shafts 30 and 31, the rolls B on shafts 32 and 33 and the rolls C on shafts 34 and 35. The shafts 30, 32 and 34 are rotatable in bearing notches in fixed bearing blocks 36 positioned between vertically spaced pairs of horizontal bars 37 projecting rearwardly from upright portions of the frame 15 and having their rear ends connected by transverse bars 38. The shafts 31, 33 and 35 are rotatable in bearing notches in slidable bearing blocks 39 having grooves in their upper and lower edges to receive a pair of the guide bars 37. Between the latter are also slidable blocks 40 with coil springs 41 interposed between them and the corresponding bearing blocks 39. Screws 42 in the bars 38 thrust against the blocks 40 to vary the tension of the springs and, hence, the pressure of the rear rolls of each pair against their coacting front rolls. It will be noted that the springs 41 will permit the rollers to open should a hard foreign object such as a large crab, shell or the like inadvertently enter the rollers. They add a safety factor to prevent damage to the rollers as well as prevent clogging when such an object enters the machine. The shafts 30, 32 and 34 are power-driven in any suitable manner, and we preferably positively drive the rear rolls from the front rolls by providing on one end of each of the shafts 30, 32 and 34 a toothed gear 45 which meshes with a similar gear 46 on each of the shafts 31, 33 and 35. The teeth of these gears are made long enough to remain in mesh throughout the range of adjustment of the shafts of the rear rolls.

While the deflector plates 28 and 29 may be fixed, we show them pivotally mounted for angular adjustment. As seen in Fig. 2, the deflector plate 28 may have downwardly projecting lugs 47 adjustable on a supporting shaft 49 or the latter may be rotatably adjusted in the upper portion of the frame 15. The deflector 29 may be similarly mounted on bracket arms 50 projecting rearwardly from an upright portion of the frame 15.

The discharge of the shrimps and water from the lower rolls C is upon a discharge conveyor 52 preferably in the form of an endless belt or apron passing around rollers 53 and 54. The roller 54 has a shaft 51 journaled in bearing bracket arms 56 which may be longitudinally adjusted as at 56a on the top 14 of the frame 11 to tighten the conveyor belt 52. The roller 53 is fixed to a transverse drive shaft 57 suitably journaled in the top 14. The water falling from the conveyor 52, which may be solid or perforated, drops into a collecting chamber or tank 58 suitably mounted beneath the top 14 and provided with an outlet 59 which may be piped to the sewer. The shrimp bodies on the conveyor may drop into a receptacle R supported on a bracket 60 at the rear of the frame.

We preferably separate the heads and other lightweight small parts from the shrimp bodies before the latter are discharged into the receptacle R or otherwise removed. As shown in Fig. 1 a suction nozzle or pipe 61 is arranged vertically at or adjacent to the discharge end of the conveyor, the open lower end of the pipe being in closely spaced relation to the conveyor and extending entirely across the same. The upper end of the suction pipe is reduced and in communication with the inlet eye of an exhaust blower or suction fan 62. The latter has its rotor fixed to the armature shaft of an electric motor 63. These parts may be mounted as seen in Fig. 1 on an extension 64 of the frame 15 and to which extension the suction nozzle may also be secured.

The other parts of the machine are preferably driven from a single electric motor 65 mounted on the base 12. The motor drives a jack shaft 66 extending across the frame and journaled in bearings on upright portions of the frame 11. The jack shaft is preferably driven by a V-belt 67 and pulleys from the motor 65. The discharge conveyor shaft 57 may be driven from the jack shaft by a V-belt 68 extending between a pulley 69 on shaft 66 and a pulley 70 on shaft 57 as seen in Fig. 3. On the other side of the machine as seen in Fig. 1, shaft 57 has a pulley 71 connected by a V-belt 72 to a pulley 73 on the drive shaft 21 of the feeding conveyor 17. The front rolls of the three sets may also be driven from the jack shaft by providing it with a pulley 74 for a V-belt 75 engaged with a pulley 76 on the shaft 34 of the front roll of the lower set C. On the other side of the machine, shaft 34 has a pulley 78 connected by a V-belt 79 to a pulley 80 on roll shaft 32 and the latter has a second pulley 80a connected by a V-belt 81 to a pulley 82 on roll shaft 30, as seen in Figs. 3 and 4. By using pulleys of proper dimensions or by other suitable driving means, the two conveyors and the several pressure or crushing rolls may be driven at the desired speeds, but we have found that with the 4 inch crushing rolls driven at about 450 R. P. M., the machine has sufficient capacity for commercial use, and that it will effectively dehead 95 percent or more of the shrimps. By tests we have found that rollers from 2 inches to 6 inches in diameter may be used but we believe 4 inch rollers produce the best results. We have also found that with factory made rollers of the proper specifications we are able to speed the machine up to as much as 800 R. P. M. for the rollers and still do a most satisfactory job. The rollers must not be too hard or too soft, and we are using the term "sponge rubber" to mean a spongy or cellular material which is elastic or resilient and which may be made from natural rubber, artificial or synthetic rubber or any equivalent synthetic material. We have for example obtained highly satisfactory results by using a synthetic sponge which is mildly oil resistant, and which according to the A. S. T. M. method of classification is designated S. C. 12 or S. C. 13 to indicate the degree of hardness of the sponge. This A. S. T. M. method of classification refers to the weight necessary to compress the sponge 25% of its height. A No. 12 sponge will require 7+ or —2 lbs. per square inch to compress the sponge 25% of its height, while No. 13 will require 11+ or —2 lbs. per square inch. The letters S. C. mean synthetic mildly oil resistant. While the numbers 12, 13 designate the preferred degrees of hardness of the roller, successful results can be obtained by using sponge somewhat harder or softer than these specifications.

The use of the machine requires very little hand labor and effects a great saving over the commonly used hand operation of removing the heads from shrimps. The crushing or pressure rollers or rolls may be anywhere from 12 inches to 30 inches or more in length, depending upon the capacity desired.

It will be seen that the machine may be effectively used to practice our new method of deheading shrimps by subjecting them to rolling resilient pressure contact which advances lengthwise or substantially lengthwise of the shrimp so that when the plane of application of the pressure reaches the weak joint connecting the head to the body of the shrimp, the head will be severed without crushing the body and mutilating its contained meat. While we believe we have set forth the correct theory of operation of our invention, namely that the heads of the shrimps are pinched off or severed from their bodies by the limited crushing action of the resilient rotary surfaces of the rolls when the shrimps pass substantially lengthwise between the opposed rolls, it is possible that at least some of the severing action may be due to the change in shape of the portions of the rubber-like resilient sponge forming the roll coverings or surfaces as the shrimps pass between them, or to other causes. However the fact is that when shrimps are passed between such opposed resilient sponge rolls having the degree of hardness or deformability above specified, the heads are severed from the bodies.

It is to be understood that while we have set forth in detail the present preferred means of practicing the invention, the latter is not confined to the precise details herein set forth by way of illustrations, since changes and variations may be made by those skilled in the art, without departing from the spirit of the invention or exceeding the scope of the following claims.

What is claimed is:
1. A shrimp deheading machine comprising a pair of resilient contacting rolls having parallel bearing shafts, each of said rolls having a body portion surrounding its respective shaft and composed of sponge rubber or the like requiring pressure from five to thirteen pounds per square inch to compress the roll one quarter of its radial thickness.

2. The structure of claim 1 in which said body portion of each roll is substantially two inches in diameter.

3. The structure of claim 1 in which said body portion of each roll is substantially four inches in diameter.

4. The structure of claim 1 in which said body portion of each roll is substantially six inches in diameter.

5. The structure of claim 1 together with a second pair of similar rolls disposed in a plane below that of the first pair, the shafts of the second pair being laterally off-set from those of the first pair, and inclined deflecting means between the two pair of rolls to direct the shrimp parts and shrimps discharged from the first pair to the crotch of the rolls of the second pair.

6. The structure of claim 5 together with means for feeding water to the rolls of the first pair.

7. The structure of claim 5 together with a traveling conveyor disposed to receive the discharge from the second pair of rolls, and suction means including a nozzle associated with said conveyor to remove therefrom the severed heads and other lightweight shrimp parts.

8. The structure of claim 5 together with means associated with the shaft of at least one roll of each pair to permit that roll to shift laterally toward and from its opposed roll, and means yieldably urging the shiftable roll of each pair toward the opposed roll.

CHARLES A. GREINER.
ELBERT F. GREINER.

References Cited in the file of this patent

UNITED STATES PATENTS

| Number | Name | Date |
|---|---|---|
| 1,367,546 | Hirth et al. | Feb. 8, 1921 |
| 1,615,081 | Hardie | Jan. 18, 1927 |
| 1,835,242 | Ryder et al. | Dec. 8, 1931 |
| 1,867,955 | Ryder | July 19, 1932 |
| 2,147,633 | Bottker | Feb. 21, 1939 |
| 2,169,905 | Sevek | Aug. 15, 1939 |
| 2,262,872 | Whitehead | Nov. 18, 1941 |
| 2,263,694 | Grayson | Nov. 25, 1941 |
| 2,412,357 | Robinson | Dec. 10, 1946 |
| 2,534,767 | Greiner et al. | Dec. 19, 1950 |
| 2,546,414 | Abbott | Mar. 27, 1951 |

FOREIGN PATENTS

| Number | Country | Date |
|---|---|---|
| 270,448 | Great Britain | May 12, 1927 |